United States Patent [19]

Dvorak et al.

[11] 4,173,041
[45] Oct. 30, 1979

[54] AUXILIARY MICROCONTROL MECHANISM FOR INCREASING THE NUMBER OF DIFFERENT CONTROL ACTIONS IN A MICROPROGRAMMED DIGITAL DATA PROCESSOR HAVING MICROWORDS OF FIXED LENGTH

[75] Inventors: Thomas J. Dvorak, Binghamton; David J. Lowdermilk, Owego; James W. Plant, Endwell, all of N.Y.

[73] Assignee: International Business Machines Corporation, Armonk, N.Y.

[21] Appl. No.: 689,228

[22] Filed: May 24, 1976

[51] Int. Cl.² ............................................... G06F 9/12
[52] U.S. Cl. .................................................. 364/200
[58] Field of Search ........................ 340/172.5; 445/1; 364/200 MS File, 900 MS File

[56] References Cited

U.S. PATENT DOCUMENTS

| | | | |
|---|---|---|---|
| 3,422,404 | 1/1969 | Ferguson | 364/200 |
| 3,585,600 | 6/1971 | Saltini | 340/172.5 |
| 3,585,605 | 6/1971 | Gardner et al. | 340/172.5 |
| 3,599,176 | 8/1971 | Cordero, Jr. et al. | 340/172.5 |
| 3,634,883 | 1/1972 | Kreidermacher | 340/172.5 |
| 3,636,522 | 1/1972 | Buschmann et al. | 340/172.5 |
| 3,768,075 | 10/1973 | Reitsma et al. | 340/172.5 |
| 3,930,236 | 12/1975 | Ferguson et al. | 364/200 |
| 3,958,221 | 5/1976 | Serra et al. | 364/200 |
| 3,990,054 | 11/1976 | Perlowski | 340/172.5 |
| 3,991,404 | 11/1976 | Brioschi et al. | 340/172.5 |
| 4,023,895 | 6/1977 | Lanza et al. | 364/200 |
| 4,037,202 | 7/1977 | Terzian | 364/200 |
| 4,075,687 | 2/1978 | Nissen et al. | 364/200 |

*Primary Examiner*—Melvin B. Chapnick
*Attorney, Agent, or Firm*—Saul A. Seinberg

[57] ABSTRACT

A microcontrol extension mechanism for increasing the number of control actions for a processor data flow section in the same manner as could be accomplished by increasing the length of the microwords in the processor control store but without actually increasing the length of such microwords. The additional control actions are obtained by means of a relatively small read only storage array having stored therein a separate pluralbit mode word for each of the different machine macroinstruction operation codes. This read only storage array is directly addressed by the operation code of the macroinstruction being processed to cause a read out of its corresponding mode word, which mode word is then set into a mode register. The output lines of the mode register are coupled to the desired additional control points in the processor data flow section. A second small read only storage array is also provided for storing the starting addresses for the different operation code microroutines in the processor control store. During the fetching of the macroinstruction to be processed, the operation code portion of such macroinstruction is used to address this second read only storage array to cause it to supply to the address register for the control store the starting address for the sequence of microwords to be used in executing such macroinstruction.

18 Claims, 6 Drawing Figures

AUXILIARY MICROCONTROL MECHANISM FOR INCREASING THE NUMBER OF DIFFERENT CONTROL ACTIONS IN A MICROPROGRAMMED DIGITAL DATA PROCESSOR HAVING MICROWORDS OF FIXED LENGTH

PRIOR ART OF INTEREST

The following prior art provides useful background information for the present invention:

(1) U.S. Pat. No. 3,391,394, granted to Gerald H. Ottaway et al on July 2, 1968, and entitled "Microprogram Control for a Data Processing System";

(2) Technical article by D. C. Hitt et al entitled "Selective Changing of Data", appearing at pages 274 and 275 of the August 1968 issue of the IBM Technical Disclosure Bulletin published by International Business Machines Corporation of Armonk, New York;

(3) U.S. Pat. No. 3,544,969, granted to Laszlo L. Rakoczi et al on Dec. 1, 1970, and entitled "Language Independent Computer";

(4) U.S. Pat. No. 3,560,933, granted to Scott J. Schwartz on Feb. 2, 1971, and entitled "Microprogram Control Apparatus";

(5) German patent application Ser. No. 2,336,676 filed in Germany by IBM Deutschland GmbH on July 19, 1973, (laid open to public inspection on Jan. 30, 1975) and entitled "Arrangement for Modifying Microprogram Instructions";

(6) U.S. Pat. No. 3,872,447, granted to Giancarlo Tessera et al on Mar. 18, 1975, and entitled "Computer Control System Using Microprogramming and Static/Dynamic Extension of Control Functions Thru Hardwired Logic Matrix";

(7) U.S. Pat. No. 3,942,156, granted to Howard C. Mock et al on Mar. 2, 1976, and entitled "Indirect Arithmetic Control"; and (8) U.S. Pat. No. 3,953,833, granted to Allen L. Shapiro on Apr. 27, 1976, and entitled "Microprogrammable Computer Having a Dual Function Secondary Storage Element".

BACKGROUND OF THE INVENTION

This invention relates to digital computers and digital data processors having control sections which are driven by microprograms stored in storage units also located in such computers and processors. Such microprograms are made up of microwords which are used in a sequential manner to control the various elemental operations performed within the computer or data processor.

As is known, efforts are continually being made to improve the performance and reduce the cost of data processors. Unfortunately, the methods available for accomplishing these objectives are frequently in conflict with one another. In general, the instruction processing speed in a data processor can be improved by using more hardware. This, however, increases the cost. What is usually sought, therefore, is a compromise which will improve the performance to cost ratio of the processor.

These considerations are particularly applicable to the case of the control section in a microprogrammed data processor. In particular, the instruction processing speed can usually be increased by increasing the length (number of bits) of the microwords which drive the control section. This is because the increased number of bits enables a greater number of control actions or elemental operations to be performed by each microword. This, however, increases the cost because more control lines, more integrated circuit input/output connections and more control hardware is required to implement the increased number of control operations.

Conversely, the cost can be reduced by decreasing the bit length of the microwords. This, however, usually results in a reduced instruction processing speed. The smaller number of bits per microword means that fewer different kinds of elemental operations are possible. This, in turn, means that the operations which are available must be used a greater number of times in order to accomplish the same result. In other words, a greater number of microwords and, hence, a greater number of sequential microword cycles must be used to accomplish the same result. This reduces the instruction processing speed and, hence, the performance.

Prior workers in the data processor art have recognized the desirability of building a better microprogrammed control section. Thus, various and sundry proposals have been heretofore made for reducing the amount of control section hardware, for increasing the flexibility of the control actions or for modifying the control section to reduce the overall processing time for the machine macroinstructions. Some of these proposals appear to achieve some net improvement, while others do not. Some achieve increased speed or flexibility but at increased cost. And some simplify the control section in one area but complicate it in another.

One class of prior art proposals is represented by the above-cited Rakoczi et al and Mock et al U.S. patents and the IBM Deutschland GmbH German patent application. These proposals seek to reduce the number of separate microword sequences or microroutines that are required to be stored in the control storage apparatus by providing one or more so-called "universal" microroutines, each of which is capable of executing a number of different machine macroinstructions. In other words, a single common microroutine is provided for a group of machine microinstructions which differ only in certain minor respects. Auxiliary hardware is then provided for detecting which macroinstruction is to be processed and for modifying one or more bits in the microwords to take into account the minor differences between the grouped macroinstructions. These proposals have the advantage of reducing the total amount of storage space required to store the total set of miroroutines, but have the disadvantage of requiring the additional hardware for taking into account the macroinstruction differences. Also, these proposals do not increase the instruction processing speed because the number of bits in each microword remains the same and, hence, the limit on the number of independent control actions remains the same.

The above-cited Tessera et al patent describes a method which allegedly enables a reduction in the length of the microwords without substantially reducing the number of independent control actions. This is accomplished by means of a hardwired sequencer which sits alongside of the control store holding the microwords and is controlled by the same microword address bits which are used to address the control store. When certain microwords are addressed, the hardwired sequencer is activated to provide additional control signals. This does appear to reduce the microword length and, hence, the over-all size of the control store, but with the added expense of providing a relatively complicated hardwired sequencer. Also, this method appears to be of somewhat limited flexibility in that the additional control signals provided by the hardwired sequencer are directly related to the particular microword being addressed.

The above-cited patent to Shapiro describes certain hardware for speeding up the macroinstruction fetching operations which constitute part of each microroutine performed by the processor. This is a desirable objective but the described additional hardware for accomplishing same is somewhat complicated and costly. More importantly, the described technique relates only to the fetching and not to the execution of macroinstructions. Thus, the improvement in performance is somewhat limited.

The cited Ottaway et al and Schwartz patents and the Hitt et al technical article describe further proposals for modifying the conventional construction of a microprogrammed control section. Ottaway et al describe the use of auxiliary hardware for modifying the next address field in microwords employing such fields. Hitt et al describe a mechanism for selectively modifying the bits in the microwords as they are set into the control register. Schwartz describes an adaptive microword decoding arrangement wherein a first group of bits in a microword are used to select the elemental microoperations to be controlled by a second group of bits in the microword. These proposals also have various advantages and disadvantages. They are, however, of generally limited applicability and do not solve the need for a relatively inexpensive mechanism which can be used in various types of processors for improving the performance/cost ratio thereof.

The above-cited prior art represents what applicants presently consider to be the best of the prior art presently known to them. No representation is made or intended, however, that better prior art does not exist. Nor is any representation made or intended that the foregoing interpretations are the only interpretations that can be placed on this prior art.

SUMMARY OF THE INVENTION

It is an object of the present invention to provide new and improved control mechanisms for a microprogrammed data processor for improving the performance thereof with a minimum of increase in cost.

It is another object of the invention to provide new and improved mechanisms for speeding up the execution of machine macroinstructions in a microprogrammed data processor.

It is a further object of the invention to provide a new and improved microcontrol extension mechanism for obtaining a greater number of independent control actions for a microprogrammed data processor employing microwords of a given length.

It is an additional object of the invention to provide a new and improved microcontrol extension mechanism for use in a microprogrammed data processor for increasing the number of control actions in the same manner as could be accomplished by increasing the length of the microwords but without actually increasing the length of the microwords.

It is another object of the invention to provide a new and improved microcontrol extension mechanism which enables a greater number of operations to be performed by microwords of a given length without increasing the number of sequential microword cycles.

It is a further object of the invention to provide a new and improved microcontrol extension mechanism which can be incorporated into an existing microprogrammed data processor at much less expense than would be required if the processor were modified to use microwords of greater length.

It is an additional object of the invention to provide a new and improved microcode starting address mechanism for use in microprogrammed data processors which enables the different microroutines to be stored in the control store in a more efficient and flexible manner.

In accordance with the invention, there is provided in a microprogrammed data processor for processing machine macroinstructions a primary store for storing plural-bit microwords of predetermined length for controlling the processor data flow, the number of different control actions provided by the different encodings of the microwords being limited by the predetermined length of the microwords. There is also provided a secondary store for storing plural-bit mode words for enabling additional control actions for the processor data flow. There is further provided secondary store address circuitry responsive to the operation codes of the machine macroinstructions being processed for reading out different ones of the mode words for different ones of the operation codes. There is also provided circuitry for coupling the output of the secondary store to the processor data flow for increasing the number of control actions in the same manner as could be accomplished by increasing the length of the microwords in the primary store.

For a better understanding of the present invention, together with other and further objects and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figures 1, 3:
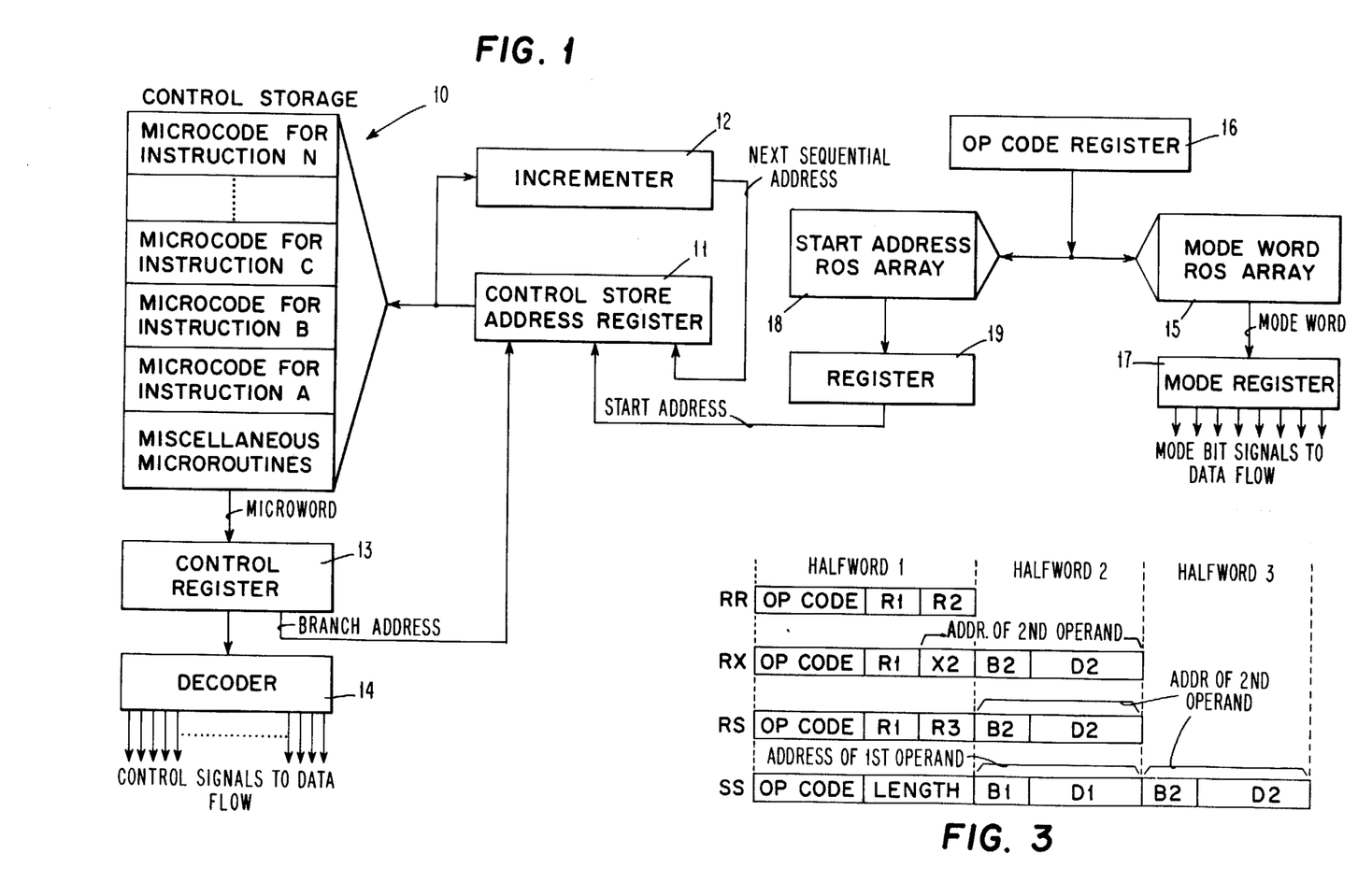
FIG. 1 shows a representative embodiment of a data processor control section constructed in accordance with the present invention.
FIG. 3 is a chart showing known formats for the machine macroinstructions which are capable of being processed by the data processor of FIGS. 2a and 2b.

Referring to FIG. 1, there is shown a data processor control section having novel control mechanisms constructed in accordance with the present invention. This control section includes a relatively large capacity primary store, represented by a control storage unit 10, for storing a relatively large number of separately addressable microwords for controlling various control points and functional elements in the processor data flow section. The control store 10 includes a separate sequence of microwords for each of the different machine macroinstruction operation codes (herein sometimes referred to as "op codes"). A first such sequence is identified in the drawing as "Microcode for Instruction A", a second such sequence is identified as "Microcode for Instruction B", and so forth. Preferably, each sequence contains all the microwords needed for executing its particular macroinstruction op code. This minimizes microcode branching which, in turn, increases the instruction processing speed. These different microword sequences for the different macro op codes will hereinafter frequently be referred to as "microroutines". Located in the lower part of the control store 10 are various miscellaneous microroutines such as, for example, interrupt handling routines, trap routines and error checking routines.

As will be seen, the present invention can be used to advantage in microprogrammed data processors of the IBM System/370 type manufactured and marketed by International Business Machines Corporation of Armonk, New York (herein referred to as "IBM"). For sake of example, therefore, it will be helpful from time to time to refer to the architecture requirements and functional characteristics of these IBM System/370 processors. It is to be clearly understood, however, that the present invention is of wider applicability and that these references are not to be construed as limiting the invention to such IBM System/370 processors.

With this in mind, it is noted that the System/370 architecture specifies an eight-bit op code, which gives a maximum of 256 different possible op code values. To date, some 166 different macroinstructions have been defined and assigned specific op code values. Thus, the control store 10 may include some 166 separate macroinstruction executing microroutines, in addition to the various miscellaneous microroutines and various housekeeping and special feature microroutines. Each macroinstruction executing microroutine may include anywhere from one to a hundred or more microwords, depending on the particular op code being considered. The required control storage capacity will vary from one System/370 model to the next and, typically, can range anywhere from 24 kilobytes up to 128 kilobytes or more. In the System/370 architecture, one byte is equal to eight bits (plus one parity check bit).

The control section of FIG. 1 further includes primary store address circuitry for reading microwords out of the primary store or control store 10. This storage address circuitry includes a control store address register (CSAR) 11 and an incrementer 12. For any given machine macroinstruction to be processed, there is initially set into the control store address register 11 the storage address of the first microword in the microroutine which executes such instruction. This first microword is then read out of the control store 10 and set into a control register 13. The address in the control store address register 11 is thereafter incremented by the incrementer 12 so as to make it equal to the storage address for the second microword in the microroutine and the incremented address is set into the control store address register 11. After completion of the elemental operations for the first microword, the second microword is read out of the control store 10 and set into the control register 13 to control a second set of elemental data flow operations. This address incrementing and control store read out process is thereafter repeated for each of the remaining microwords in the microroutine being considered. The last microword in each microroutine is an instruction fetch or I-fetch microword which operates to fetch the next machine macroinstruction and get it ready for execution by its particular microroutine.

The control section of FIG. 1 further includes decoder circuitry, represented by a decoder 14, coupled to the output of the control register 13 for decoding the microword residing therein and supplying control signals to various control points and functional elements in the processor data flow section. The data flow section of the processor is the part that manipulates the data to obtain the desired result data. Typically, it includes an arithmetic and logic unit (ALU) for performing various mathematical and logical operations and various registers for temporarily holding the operands to be operated on and the result operand. The arithmetic and logic unit and the operand registers are examples of functional elements. The control points typically take the form of sets of control gates which enable and disable the flow of data along the data flow buses which interconnect the various functional elements. The output lines of the decoder 14 are coupled to the different ones of the control points and functional elements and supply thereto the control signals which enable or disable the control gates and cause the functional elements to perform the desired actions.

The microwords coming out of the control store 10 have a coded structure or format. In particular, each microword is subdivided into different control fields, each such control field being a set of bits in the microword. For the case of an arithmetic ADD operation, for example, one control field may be used to identify the register containing the first operand, another control field may be used to identify the register containing the second operand and a third control field may be used to tell the ALU which function to perform, in this case the ADD function. Assume, for example, that the first operand may be in any one of sixteen possible registers. In this case, the first operand identifying or "address" field would contain four bits which are coded to have a binary value corresponding to the address or identity number of the desired register. The decoder 14 would then have a set of sixteen output lines which individually run to control gates associated with the different ones of the sixteen registers for controlling their connection to the ALU. For a given binary code value in the four-bit microword address field, a particular one of the sixteen decoder output lines would be activated to connect the selected register to the ALU. Because the operand address field is encoded, a given bit in such field cannot be said to be directly associated in a one-for-one manner with a particular control point in the data flow. Instead, it is the coded value of the control field as a while which selects the particular control point, the decoder 14 providing the necessary decoding and selection of the proper control point. The use of coded control fields has the advantage of enabling a given number of microword bits to control a larger number of control points. In the given example, a coded four-bit "address" field enables the control of sixteen different control points.

The control section of FIG. 1 also includes a first small capacity secondary store 15 having stored therein a plurality of separately addressable plural-bit mode words. This secondary store or mode word store 15 is preferably an integrated circuit read only storage array. This mode word array 15 has a separate addressable storage location for each of the different machine macroinstruction op codes, each such location containing one of the mode words. In other words, each op code has its own mode word. This does not mean, however, that each mode word has a bit pattern which is different from all the other mode words. Depending on the circumstances, the mode words for two or more different op codes may have the same bit pattern. Also, in some cases the mode word for a particular op code may have a bit pattern of all zeros. This case of an all zero bit pattern represents the case where no mode word control action is desired for the corresponding macroinstruction op code.

For simplicity and minimum expense, the mode word array 15 is preferably directly addressed by the macroinstruction op codes. This is accomplished by connecting an op code register 16 directly to the addressing circuitry of the array 15. The op code register 16 is loaded with the op code of the macroinstruction to be processed during the instruction fetch cycle for such macroinstruction. In view of this direct addressing, this would mean that for the IBM System/370 eight-bit op code, the mode word array 15 would have a total of 256 separately addressable storage locations.

After the op code is set into the register 16, the addressed mode word is read out of the array 15 and set into a mode register 17. This also is done during the instruction fetch cycle. The number of bit stages in the mode register 17 is equal to the number of bit positions in the mode word. The mode register 17 has a plurality of output lines which are coupled to additional processor data flow control points and/or functional elements, over and above those capable of being controlled solely by the microwords in the control store 10. Typically, the mode register 17 will have one output line for each bit position in the mode word though, in some cases, one or two or a few bit positions might not be used in a particular processor, in which case the corresponding mode register output lines would be omitted.

The mode words in the array 15 do not have a coded subfield type structure and each mode register output line runs to its control point in a direct and fixed manner. In other words, no decoder is needed for the output of the mode register 17 and there is a one-to-one correspondence between bit positions in the mode word and control points in the processor data flow section.

The mode word array 15 and the mode register 17 provide additional control actions or control functions over and above those capable of being provided by the microwords in the control store 10. This is accomplished without increasing the number of microwords and microword cycles required to execute a particular instruction. This is because the mode bit control signals from the mode register 17 are called up during the instruction fetch and are available for use throughout the execution microword cycles. In fact, just the opposite of increasing the number of microwords is true. For those op codes which make use of the mode bits, the added control capability provided by the mode bits is, in most cases, used to reduce the number of microwords and microword cycles required to execute those op codes. Thus, the mode word array 15 and the mode register 17 enable the instruction processing speed to be increased for a substantial number of the machine macroinstructions.

The control section of FIG. 1 further includes a second small capacity secondary store 18 having stored therein a plurality of starting addresses for different sequences of microwords in the control store 10. This second secondary store 18 is also preferably an integrated circuit read only storage array. This second or start address array 18 has a separately addressable storage location for each of the different machine macroinstruction operation codes and is preferably directly addressed by the macroinstruction op code in the op code register 16. Thus, for the case of the System/370 eight-bit op code, the start address array 18 would include 256 addressable plural-bit storage locations. The address stored in each storage location in the array 18 is the primary store address for the first microword in the microroutine for executing the op code which addresses that location in the array 18. The contents of the storage location in array 18 which is addressed by the op code in the register 16 is set into a register 19 during the instruction fetch cycle for the op code doing the addressing. Toward the end of this instruction fetch cycle, the address in register 19 is set into the control store address register 11 to provide therein the starting address for the desired microroutine.

The use of the start address array 18 provides an added degree of flexibility which can be used to prevent waste of storage space in the control store 10. As mentioned, the microroutines for different macro op codes contain different numbers of microwords. Some microroutines contain only a few microwords and other microroutines contain many microwords. In order to simplify the control storage addressing, it is the practice in a goodly number of processors to form the microroutine starting address by forcing the op code bits into higher order positions in the storage address register. When this is done, the microroutine starting addresses are spaced apart by fixed intervals of arbitrary length which have no relationship to the number of microwords which may be stored in the fixed interval. The interval must be big enough to accommodate the microroutine having the largest number of microwords. This means, however, that for some of the shorter microroutines there will be unused storage space in the fixed interval. This, of course, is wasteful of storage space. The use of the start address array 18 overcomes this problem. It enables the starting addresses to be spaced apart in accordance with the number of microwords in the microroutines so that there will be little, if any, wasted storage space in the control store 10.

As indicated in FIG. 1, there are three different types of addresses, any one of which may be set into the control store address register 11 when needed. One is the microroutine starting address provided by the array 18. Another is the next sequential address provided by the incrementer 12. This next sequential address source is used to step from one microword to the next during the course of a given microroutine. The third possible address is a branch address which may be set into the control store address register when a branch type microword is residing in the control register 13. Typically, a branch type microword causes the decoder 14 to look for the occurrence of a certain status or condition in the processor. If such status or condition is found to exist, then the branch address is set into the address register 11 to cause some microword other than the next sequential microword to be the next microword to be set into the control register 13. This branching may be to another microword in the same microroutine or, in some cases, to one of the miscellaneous microroutines.

Figure 2A:
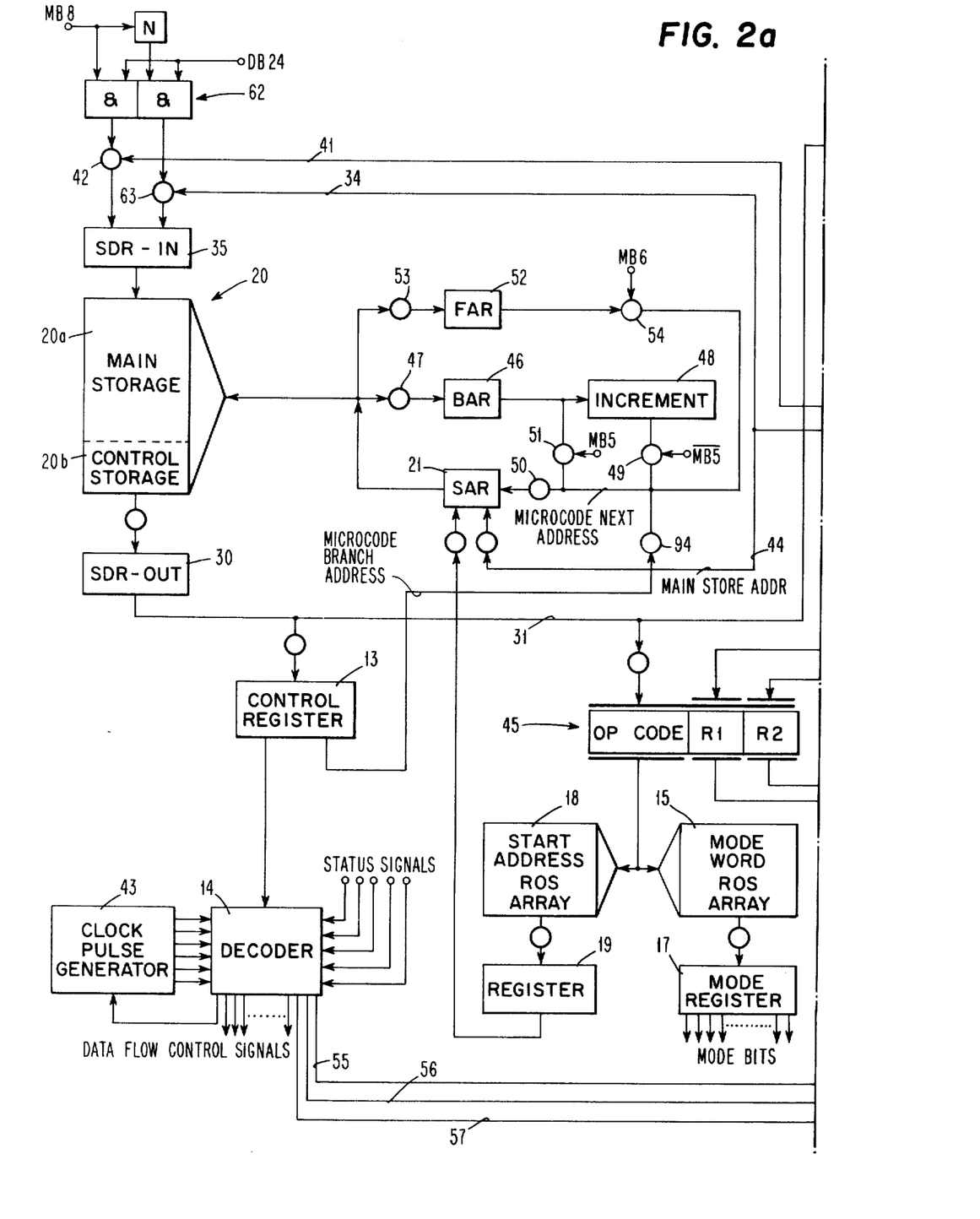
FIGS. 2a and 2b, when placed side by side, show the data flow of an improved version of an existing data processor, such improved version having the novel control section of FIG. 1 incorporated therein.
Figure 2B:
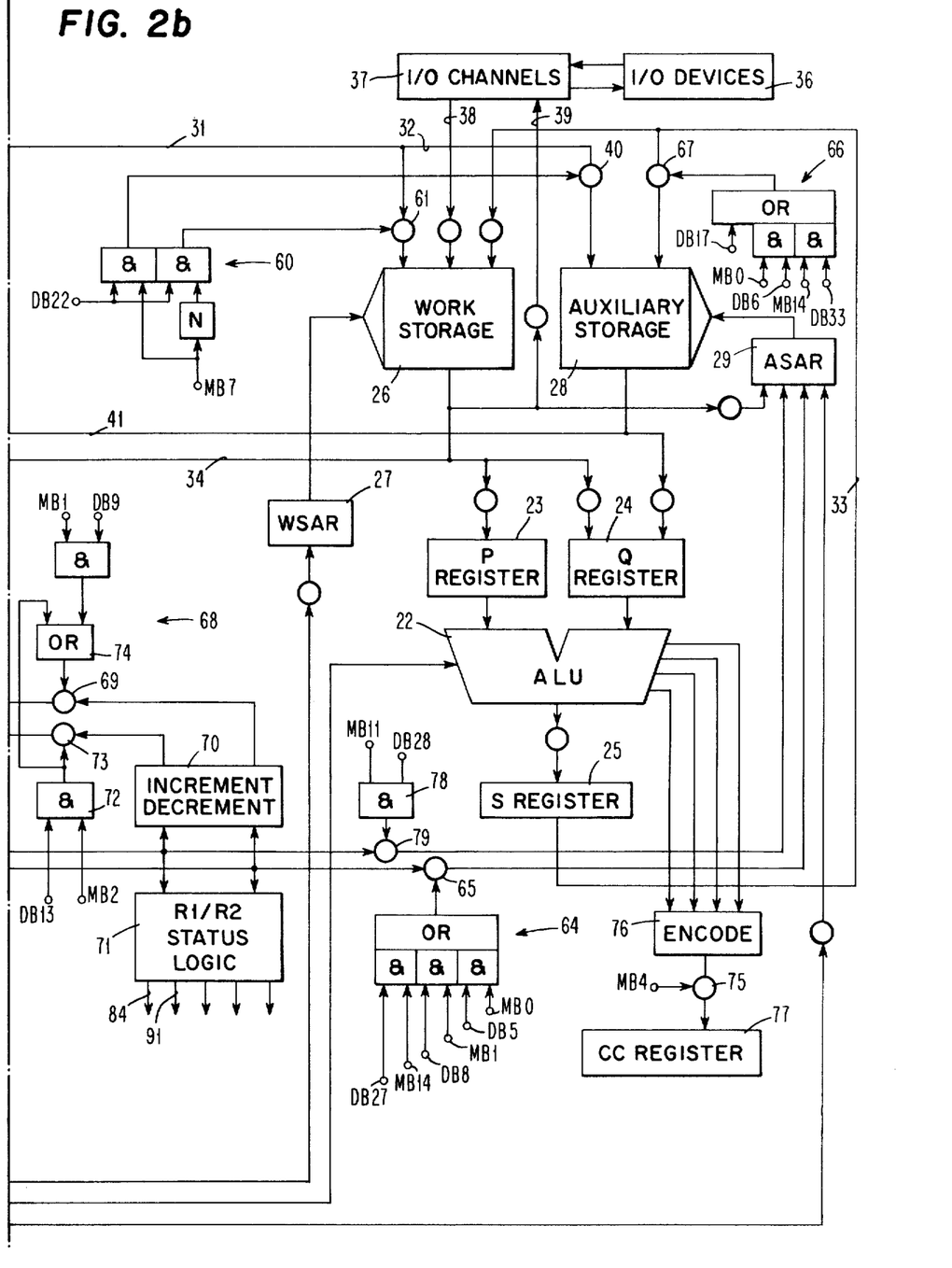

Referring now to FIGS. 2a and 2b, such figures, when placed side by side with FIG. 2a on the left, show the manner in which the novel control section of FIG. 1 may be incorporated into an improved version of an existing microprogrammed data processor. The data processor chosen for illustration is the IBM System/370 Model 135 processor which is manufactured and marketed by the International Business Machines Corporation of Armonk, New York (herein referred to as "IBM"). For ease of comparison, the same reference numerals as used in FIG. 1 will be used in FIGS. 2a and 2b for the control section elements which correspond to those in FIG. 1. This, however, is not meant to imply that the invention is limited to control elements which meet the requirements of the Model 135 processor.

In view of the relatively large amount of publicly available information on the Model 135 processor, the following description of the parts common to such processor will be rather abbreviated. For further information and details concerning such Model 135 processor parts, reference may be made to the following IBM publications: "IBM System/370 Model 135 Functional Characteristics", Order No. GA33-3005, Sixth Edition dated August 1974; "A Guide to the IBM System/370 Model 135", Order No. GC20-1738, Sixth Edition dated January 1974; and "3135 Processing Unit Theory and Maintenance Manual", Order No. SY33-0032, Sixth Edition dated March 1975. A detailed description of the System/370 architecture and general principles of operation is set forth in the following IBM publication: "IBM System/370 Principles of Operation", Order No. GA22-7000, Fourth Edition dated January 1973. Copies of these publications may be obtained from any IBM Branch Office throughout the world. The descriptions set forth in these above-cited publications are hereby incorporated in the present application by this reference thereto.

FIGS. 2a and 2b show the data flow for an improved version of the Model 135 processor. One area of improvement is, as indicated, the use of the novel control section features described in connection with FIG. 1. Other areas of improvement, which will be pointed out during the course of the following discussion, involve improvements which are made possible because of the use of the improved control section. In other words, FIGS. 2a and 2b show additional improvements which can be incorporated into the existing Model 135 processor because the mode word array 15 and mode register 17 provide the additional control capability needed to control these other improvements.

The processor shown in FIGS. 2a and 2b (hereinafter collectively referred to as "FIG. 2") includes a primary storage unit 20 having a main storage portion 20a and a control storage portion 20b. Both portions are addressed by a common or single storage address register (SAR) 21. The FIG. 2 processor further includes an arithmetic and logic unit (ALU) 22 for performing the usual arithmetic and logical operations on operands residing in P and Q registers 23 and 24 which feed the two inputs of the ALU 22. The result of the arithmetic or logical operation is set into an S register 25. If desired, the data in either the P register 23 or the Q register 24 can be passed through the ALU 22 and set into the S register 25 without modification.

The FIG. 2 processor further includes a work storage unit 26 addressable by means of a work storage address register (WSAR) 27 and an auxiliary storage unit 28 addressable by means of an auxiliary storage address register (ASAR) 29. Work store 26 is subdivided into 64 addressable halfword length (two byte or sixteen bit) registers which are used by the microcode in performing the various processor internal operations. The auxiliary store 28 is also subdivided into 64 addressable halfword length registers but, in contrast to the registers in work store 26, the majority of the auxiliary store registers are used for purposes dictated by the macroprogram and, hence, by the programmer who wrote same. The registers in auxiliary store 28 are grouped to provide 16 fullword general purpose registers, eight fullword floating point registers and eight fullword processor work registers.

The basic data flow width of the FIG. 2 processor is sixteen bits or two bytes. The total width of the data buses is actually eighteen bits because a parity check bit is also provided for each eight-bit byte of data but, for simplicity of explanation herein, the parity check bits will be ignored.

During the performance of a typical customer program or macroprogram, data is read out of main storage 20a and set into an output storage data register (SDR) 30. The data is then moved, two bytes at a time, either to the work store 26 by way of a two-byte data bus 31 or to the auxiliary store 28 by way of two-byte data buses 31 and 32. After the appropriate data has been loaded into the work store 26 and/or the auxiliary store 28, it can be processed by the ALU 22. For example, a first operand can be read out of the auxiliary store 28 and set into the Q register 24 and a second operand can be read out of the work store 26 and set into the P register 23. The ALU 22 can then perform the desired arithmetic or logical operation with the two operands and the result is set into the S register 25. The result is thereafter returned to the work store 26 by way of a two-byte data bus 33. The result data may thereafter be sent from the work store 26 back to the main storage 20a by way of a two-byte data bus 34 and an input storage data register (SDR) 35.

If the operands to be operated on have lengths greater than two bytes, then the foregoing procedures are repeated in two-byte steps until the desired operation has been performed on the entire operand length. Thus, for example, the operands are moved from the output SDR 30 to the work store 26 and auxiliary store 28 two bytes at a time. The arithmetic or logical operation is then performed two bytes at a time, with each two bytes of the result being loaded into the work store 26 as it becomes available. After completion of the arithmetic or logical operation, the result is sent to the input SDR 35 two bytes at a time.

External data is supplied to the FIG. 2 processor by input/output (I/O) devices 36 which communicate with the processor by way of I/O channels 37 and an input data bus 38, the latter running to the work store 26. Conversely, data is sent from the processor to the I/O devices 36 by way of output bus 39 and I/O channels 37, output bus 39 being driven by the output of work store 26. Thus, all communications between the peripheral I/O devices 36 and the processor are conducted by way of the work store 26.

The functional elements and data buses 20–39 discussed up to this point are things which are present in the existing Model 135 processor. It is of interest at this point to briefly consider a couple of the improved features which are made possible by the additional control actions provided by the mode word array 15. A first of these features relates to the data bus 32 used in moving data from the main store 20a to the auxiliary store 28. This data bus 32 is presently available in the Model 135. However, because of control capability limitations established by the length of the Model 135 microwords, this data bus 32 is not used. In other words, the Model 135 does not take data from the main store 20a and write it directly into the auxiliary store 28. It is, instead, written into the work store 26. Then, during a subsequent microword cycle, it is written from the work store 26 into the auxiliary store 28 by way of the ALU 22 and data bus 33. In the processor presently being described, this limitation is not present and data can be written directly into the auxiliary store 28 from the main store 20a by way of the bus 32.

Each of the small circle symbols, such as the circle symbol 40 associated with data bus 32, represents a set of control gates for enabling and disabling the flow of data along the associated data bus. Each control gate set includes a gate circuit for each conductor in the data bus. There gate circuits are controlled in unison so as to enable or disable the data bus as a whole. As will be seen, the control gates 40 for the bus 32 are controlled by mode bit 7 (MB7) appearing on output line number 7 of the mode register 17.

A second new feature is the provision of an additional two-byte data bus 41 for enabling data in the auxiliary store 28 to be written directly into the main store 20a. This added data bus 41 is controlled by control gates 42 which are, in turn, controlled by mode bit 8 (MB8) from the mode register 17. In the existing Model 135 processor, data cannot be written directly from the auxiliary store 28 to the main store 20a. It must, instead, be written into the work store 26 and then from the work store 26 to the main store 20a.

It can be appreciated from the foregoing that these new features made possible by the additional control capability serve to reduce the number of microwords needed to move data from auxiliary store 28 to main store 20a or vice versa.

Figure 4:
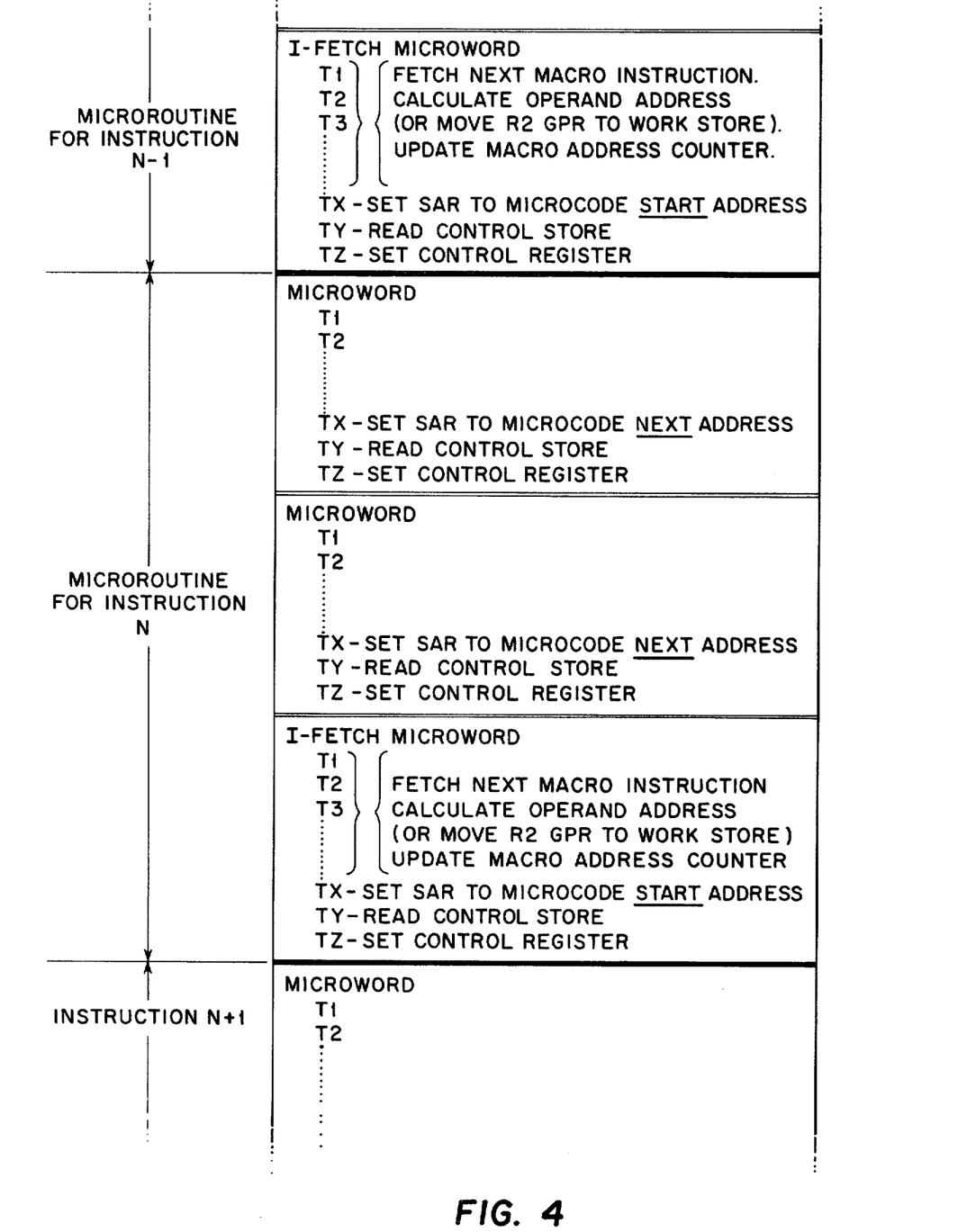
FIG. 4 is a simplified timing chart used in explaining the operation of the data processor of FIGS. 2a and 2b.

Turning now to the control section, it is helpful to first consider the macroinstruction format chart of FIG. 3 and the simplified timing chart of FIG. 4. FIG. 3 shows some of the machine macroinstruction formats used in the IBM System/370 processors. As there indicated, a macroinstruction can vary in length from one to three halfwords, wherein a halfword is equal to two bytes or sixteen bits. The RR format is a so-called "register-register" format wherein the two operands to be operated upon are located in either the general purpose registers or the floating-point registers (located in auxiliary store 28 in the present embodiment) identified by the R1 and R2 fields. The RX and RS type macroinstructions are so-called "register-storage" instructions wherein one operand is located in a general purpose register or floating-point register (auxiliary store 28) and the other operand is located in main storage, in this case main store 20a. The SS type macroinstructions are so-called "storage-storage" instructions wherein both operands are located in main storage, in this case the main store 20a.

A point to note is that, regardless of type, the highest order eight bits always constitute the op code which defines the macrooperation to be performed. The op code specifies various macrooperations such as Add, Subtract, And, Or, Compare, Load, Store, Move, Shift Right, Shift Left, Branch on Condition, and so forth. For some of these general operations, there may be several different op code values relating to the different formats that may be used. For example, there is an RR Add op code, an RX Add op code and an SS Add op code.

The customer's program to be performed by the data processor is composed of machine macroinstructions plus the data to be operated upon by such macroinstructions. Initially, these macroinstructions and data are supplied to the processor by an I/O device 36 and are initially loaded into the main store 20a (by way of work store 26). Thereafter, the desired operations are accomplished by reading the macroinstructions out of the main store 20a one at a time. This reading out of a macroinstruction is called an "instruction fetch" and is done during an I-fetch cycle or I-cycle.

The execution of each macroinstruction is controlled by a sequence of one or more microwords which are stored in the control store 20b and which are read out and set into the control register 13 one at a time in a sequential manner. A typical sequence of events is represented by the simplified timing chart of FIG. 4. As there indicated, the microroutine for macroinstruction N is comprised of three sequential microwords, the last microword being the I-fetch microword for fetching the mext macroinstruction N+1. A given microword is set into the control register 13 to control the decoder 14. The bit pattern in this microword determines which ones of the decoder output lines will be activated. For a given microword bit pattern, a given set of decoder output lines will be activated. The output lines in the selected set will not, however, all be activated at one and the same time. Instead, different ones will be activated during different clock pulse intervals T1, T2, T3, etc. These clock pulse intervals are established by a clock pulse generator 43 which supplies the T1, T2, T3, etc., clock pulses to the decoder 14 over separate clock pulse lines and in a time sequential manner. Thus, each microword enables the performance of a series of elemental operations which are performed during different ones of the T1, T2, T3, etc., clock pulse intervals. Typically, two or three or more nonconflicting elemental operations may be performed during a given clock pulse interval. The time required for the occurrence of the complete sequence of timing pulses T1, T2 ... TZ for a single microword is called a "microword cycle". Thus, each microword cycle is made up of a sequence of clock pulse intervals.

The status signals supplied to the decoder 14 come from various points in the data flow and are principally used in connection with branch on condition type microwords. Thus, if a branch type microword resides in the control register 13 and the status signal line interrogated by such branch word indicates the occurrence of a certain condition, then the decoder 14 will cause the processor to select an out-of-sequence microword as the next microword.

For purposes of explanation herein and unless otherwise noted, the control register 13, the decoder 14 and the clock pulse generator 43 shown in FIG. 2 are assumed to be of generally the same construction and operation as the control register, the decoder and the clock pulse generator used in the existing Model 135 processor. In particular, each microword set into the control register 13 is assumed to have a length of 16 bits, which is the same as in the Model 135.

As indicated in FIG. 4, the last microword in each microroutine is an instruction fetch microword for fetching the next macroinstruction. Thus, during the execution of macroinstruction N-1, there is eventually reached the last microword in the microroutine, which is the I-fetch microword. This I-fetch microword causes the storage address of the next macroinstruction N to be set into the storage address register (SAR) 21. This storage address is obtained from a register in the work store 26 which is used as a macroinstruction address counter and is supplied to SAR 21 by way of data buses 34 and 44. The first halfword of the macroinstruction N is then read out of the main store 20a and set into SDR 30. This first halfword is then set into an instruction register in the work store 26 and the macroinstruction address counter in work store 26 is updated by a count of two (storage unit 20 is addressable by the byte and a halfword contains two bytes). This first halfword of the macroinstruction is also set into a special two-byte wide hardware register 45.

If the op code contained in this first macroinstruction halfword indicates that a register-register macrooperation is to be performed, then the I-fetch microword causes the contents of the general purpose register designated by the R2 field of the macroinstruction to be transferred from the auxiliary store 28 to a preassigned register in the work store 26.

If, on the other hand, the op code indicates that the macroinstruction is a non-RR instruction, then, in this case, the I-fetch microword causes the second halfword of the macroinstruction to be fetched. In particular, the second halfword address is obtained from the macroinstruction address counter in work store 26 and set into SAR 21. The second halfword is then read and set into SDR 30. As indicated in FIG. 3, this second halfword includes data from which can be determined the main storage address of an operand. In particular, this second halfword contains a base register identifying field B and an address displacement field D. The I-fetch microword causes the effective main storage address (B+D) to be formed by adding the displacement field D to the contents of the designated base register B. The resulting main storage address is stored in a preassigned pair of registers in work store 26 which are used as an operand address counter. Also, the macroinstruction address counter in work store 26 is again updated by a count of two.

If the macroinstruction is of the storage-storage type, the third halfword thereof will not be fetched during the I-fetch cycle. It will instead be fetched and processed as a preliminary step in the execution phase of such an SS macroinstruction.

Toward the end of the I-fetch cycle, the I-fetch microword causes the starting address for the microroutine for macroinstruction N to be set into SAR 21. This starting address is obtained from the start address array 18. The proper starting address is picked by the op code residing in the op code field in hardware register 45. During an earlier portion of the I-fetch cycle, the selected starting address is set into the register 19. Then, at the appropriate point near the end of the I-fetch cycle (TX in FIG. 4), it is set into SAR 21 to address the storage unit 20. The addressed location in this case resides in the control storage portion 20b. The addressed starting microword is then read and set into SDR 30. Then, as the last step in the I-fetch microword cycle, this starting microword is set into the control register 13 to commence the execution of the microroutine for macroinstruction N.

As seen in FIG. 4, the final steps in each microword of the microroutine for instruction N include the fetching of the next microword. Thus, in absence of branching, the microroutine progresses from one microword to the next until completion.

At this point, note should be made of the source from which is obtained the storage address for the next microword. At the beginning of a microword, the storage address for that microword is sitting in SAR 21. During the course of executing the microword, however, it may be necessary to put data into or take data out of the main store 20a. This necessitates the setting of a main store address into SAR 21. Thus, when it comes time to address the next microword, the address of the current microword may no longer be present in SAR 21.

This problem is solved by the use of a buffer address register (BAR) 46 which sits alongside SAR 21 and which, in effect, functions as a microword address counter. When a microword address is first set into SAR 21, it is also set into BAR 46 by way of control gates 47. Control gates 47 are then disabled and, after the microword has been read from storage and set into control register 13, SAR 21 is free to receive main store addresses. At the end of the microword, the next microword address is obtained by taking the address in BAR 46, incrementing it by means of incrementer 48 and setting the incremented address into SAR 21 by way of control gate sets 49 and 50. At that point, the incremented address is also set into BAR 46 by way of control gates 47 to enable this process to be repeated at the end of the then current microword.

In accordance with another improved feature for the FIG. 2 processor, the incrementing action is sometimes inhibited and the same microword address supplied back to SAR 21. This is accomplished by keeping the control gates 49 disabled and, instead, enabling the control gates 51 to pass the same microword address back to SAR 21. Simply put, this enables a given microword to be automatically repeated. Where appropriate, it can be repeated several times in succession. This will be discussed at greater length hereinafter.

The address circuitry for the primary storage unit 20 also includes a forced address register (FAR) 52 which is coupled in parallel with BAR 46 and incrementer 48. FAR 52 enables an automatic repeating or wrapping of a plural microword portion of a given microroutine. This automatic plural-microword wrapping constitutes another improved feature of the FIG. 2 processor and will be considered in greater length hereinafter. Briefly considered, upon occurrence of a particular microword in a given microroutine, the storage address for this microword is set into FAR 52 by way of control gates 53. This particular microword address then sits in FAR 52 while the next two or three or more successive microwords are executed. Then, at the end of some predetermined subsequent microword, the address in FAR 52 is set into SAR 21 by way of control gates 54 to establish the next microword address. Since this FAR address is the address of an earlier microword, this causes a repeating of the intervening sequence of microwords. FAR 52 thus enables the automatic repeating or wrapping of a subroutine portion of a given microroutine.

Considering now the mode word array 15 and the additional control actions made possible by the use thereof, it is assumed for sake of example that each mode word in the array 15 has a length of 16 bits. Thus, mode register 17 is also assumed to have 16 bit stages and 16 mode bit output lines. As previously indicated, each microword in the control store 20b also has a length of 16 bits. This correspondence between mode word length and microword length is purely coincidental and has no inherent significance. The mode word length could just as readily be greater than or less than the microword length, depending on the needs of the particular processor being considered.

The output lines of the mode register 17 run to various control points scattered throughout the FIG. 2 data flow. For simplicity of illustration and ease of understanding, the entire length of each of these lines is not shown in the drawings. Instead, all that is shown is their opposite ends at the places where they are connected to the data flow. These opposite ends are identified as MBφ, MB1, MB2, etc., where "MB" denotes mode bit and the number denotes the number of the mode bit. Thus, for example, "MB8" denotes "mode bit 8" which appears on the number 8 output line of mode register 17. A further point to note is that the data flow connections for some of the mode bits are not shown in the drawings and these mode bits will be treated only in a summary manner herein. The intent is to describe in detail only a limited number of representative ones of the mode bits.

A similar descriptive scheme is used for the various output lines of the decoder 14. The designation "DB" plus a number is used to identify the point at which a particular decoder bit output line is connected to the data flow, "DB" denoting "decoder bit". The numbers used in connection with the DB designations are not intended to correlate with any numbers that may be used in the Model 135 processor. They are only used to indicate herein that different decoder output lines are involved at the different control points. It should also be noted that some of the small circle symbols used to denote sets of control gates in FIG. 2 do not have any legends identifying the source of the control signals which control them. In such cases, it is to be understood that such an unmarked control gate set is controlled by one of the output lines from the decoder 14. A further point to note is that output elements 55, 56 and 57 of the decoder 14 are plural conductor buses and not single conductor lines. Decoder output bus 55 supplies address bits to WSAR 27, while output bus 56 supplies command bits to ALU 22 and output bus 57 supplies address bits to ASAR 29.

Each mode word in mode word array 15 has sixteen bits and each of these mode bits is capable of controlling an additional control action or control function in the FIG. 2 processor. In particular, when a given mode bit is on, its corresponding function or action is enabled and when such mode bit is off, its corresponding function or action is disabled. The following table lists the sixteen different mode bits and their manner of usage in the improved processor of FIG. 2:

| MODE BIT | FUNCTION |
|---|---|
| MBφ | Load Register Mode |
| MB1 | Load/Store Multiple Mode |
| MB2 | Move Mode |
| MB3 | Set Condition Code 0-1-2 |
| MB4 | Set Condition Code 0-1-2-3 |
| MB5 | Inhibit Microword (BAR) Increment |
| MB6 | Wrap Mode (wrap part of a microroutine) |
| MB7 | Write to Auxiliary Store from Main Store |
| MB8 | Write to Main Store from Auxiliary Store |
| MB9 | Byte Write Mode (write from either byte of work store to main store) |
| MB10 | Use Floating Point Register |
| MB11 | Read Auxiliary Store Addressed by R2 Field of Hardware Register 45 |
| MB12 | Check R2 Field of Hardware Register 45 for Floating Point Specification |
| MB13 | Check R1 Field of Hardware Register 45 for Floating Point Specification |
| MB14 | Write Data to Auxiliary Store Addressed by R1 Field of Hardware Register 45 |
| MB15 | Degate High Order Byte to Auxiliary Store |

For sake of brevity, some of these mode bits and functions will not be discussed herein.

Considering first mode bit 7, this mode bit is supplied to control point logic 60 for enabling control of control gates 40 for enabling data to be written into the auxiliary store 28 from main store 20a by way of the data bus 32. When MB7 is on, control gates 40 are enabled to pass data to the auxiliary store 28. At the same time, MB7 is used to disable control gates 61 to prevent the data from being written into work store 26. This is done because the timing for the control gates 40 is obtained by means of the same microword format as is used for a main store to work store write operation. This timing is controlled by decoder bit DB 22, which occurs at that point during a main store to work store microword at which the data is to be written into the work store. In other words, advantage is taken of the existing Model 135 microword structure to obtain either the new write to auxiliary store 28 or the existing write to work store 26. If mode bit 7 is on, the write is to the auxiliary store 28 and if mode bit 7 is off, the write is to work store 26. Since mode bit 7 is on during the entire duration of the microroutine, decoder bit 22 establishes the precise clock pulse interval during which the write occurs.

The use of mode bit 7 saves at least one microword cycle. Previously, it was necessary to write from main store to work store during one microword cycle and then to write from work store to auxiliary store during another microword cycle. Data could not be written directly from main store to auxiliary store.

Among other things, mode bit 7 is useful in connection with RX Load (L) and RS Load Multiple (LM) macroinstructions. In the latter case, mode bits 1 and 5 are also used along with mode bit 7. Also, mode bit 7 saves one microword for each register which is loaded.

Mode bit 8 provides a similar type of operation for transferring data in the opposite direction, namely, from auxiliary store 28 to main store 20a. As such, MB8 is supplied to control point logic 62 to control the control gates 42 for the new auxiliary store to main store data bus 41. If a work store to main store type microword occurs and MB8 is on, then the existing work store to main store control gates 63 are disabled and the new auxiliary store to main store control gates 42 are enabled to enable auxiliary store data to be written directly into the main store 20a. If mode bit 8 is off, gates 42 are disabled and gates 63 are enabled to allow data to move from work store 26 to main store 20a in the previously used manner.

Among other things, mode bit 8 is useful in connection with RX Store (ST) and RS Store Multiple (STM) macroinstructions. In the latter case, mode bits 1 and 5 are also used along with mode bit 8. The use of mode bit 8 saves one microword cycle for each register which is stored.

Mode bit φ is used to speed up certain load register macroinstructions such as the RR Load (LR) and the RX Load Address (LA) instructions. In particular, mode bit 100 enables the loading of the register to be accomplished during the I-fetch cycle itself. For the Load (LR) instruction, for example, the operation to be performed is to transfer the contents of the general purpose register designated by the R2 field of the macroinstruction to the general purpose register designated by the R1 field of the macroinstruction. As previously indicated, the I-fetch microword automatically puts the contents of the R2 register into work store 26. This is accomplished by reading the R2 operand out of auxiliary store 28, setting it into Q register 24, passing it through ALU 22, setting it into S register 25 and passing it by way of data bus 33 to the work store 26. Thus, there is an interval of time during which the R2 operand is resident in S register 25. If mode bit $\phi$ is on, then during such interval, the R2 operand is also written into the R1 designated register in the auxiliary store 28 by way of data bus 33 and control gates 67. In other words, when the R2 operand is written into the work store 26 by the I-fetch microword, it is also written into the R1 location in auxiliary store 28 if mode bit $\phi$ is on. To this end, MB$\phi$ is supplied to control point logic 64 to enable control gates 65 to allow the R1 field in hardware register 45 to supply the R1 address value to ASAR 29. In conjunction therewith, MB$\phi$ is also supplied to control point logic 66 for enabling control gates 67 to allow the desired write-in to the auxiliary store 28. These elemental operations are timed by decoder bits 5 and 6 which occur during the I-fetch cycle. This, the only microword that is required for the RR Load (LR) microroutine is the I-fetch microword which is needed to fetch the next following macroinstruction.

Mode bit 1 is used in conjunction with the RS format Store Multiple (STM) and Load Multiple (LM) macroinstructions to enable the R1 portion of the hardware register 45 to be used as a counter for counting the registers that have been stored or loaded and also for enabling the R1 portion to supply to ASAR 29 the address of the general purpose register to be stored or loaded. This is accomplished in part by supplying MB1 to control point logic 68 which controls control gates 69. This enables the R1 field in register 45 to be incremented by an incrementer/decrementer 70 each time one of the multiple registers is stored or loaded. MB1 is also supplied to the control point logic 64 for controlling the control gates 65 for supplying the R1 field in register 45 to ASAR 29 to enable the addressing of the particular one of the multiple registers to be stored or loaded.

R1/R2 status logic 71 is responsive to the R1 and R2 fields in the hardware register 45 for producing on different output lines status signals indicating the occurrence of various R1 and R2 conditions, both singly and relative to one another. Among other things, status logic 71 produces on one of its output lines (output line 84) a unique status signal when the value of R1 is incremented to a value greater than R2. This tells the processor that the last of the multiple registers has been stored or loaded. The use of this status signal will be discussed hereinafter in connection with a discussion of the improved performance by the FIG. 2 processor of Store Multiple and Load Multiple macroinstructions.

Mode bit 2 is used in connection with certain SS type macroinstructions for enabling the R1 and R2 portions of the hardware register 45 to be used in combination as a singular length counter. As indicated by the SS format of FIG. 3, the length of the data (expressed in number of bytes) to be operated upon is set into the R1-R2 portion of the register 45 during the I-fetch cycle. Thereafter, as successive portions of the data are operated upon, the R1-R2 length counter is decremented by incrementer/decrementer 70 to enable the status logic 71 to produce on one of its output lines (output line 91) a signal to tell the processor that the last portion of the data has been processed. To enable this counter function, mode bit 2 is supplied to control point logic 72 which controls the control gates 73 for use in decrementing the R2 field. The output of control point logic 72 is also supplied to an OR circuit 74 in control point logic 68 for enabling the R1 control gates 69 to operate in unison with the R2 control gates 73.

Mode bit 4 is used to enable an automatic hardware setting of a four-value type (0-1-2-3) condition code. To this end, MB4 is supplied to control gates 75 located intermediate a condition code encoder 76 and a condition code register 77. Encoder 76 receives status lines from ALU 22 which indicates the following conditions for the result appearing at the output of ALU 22: result zero; result negative; result positive; and overflow. The occurrence of different ones of these conditions causes activation of different ones of the status lines running to the encoder 76. Encoder 76 encodes the four status line values into a two-bit condition code which, when mode bit 4 is on, is set into the two-bit condition code register 77. The condition code register 77 is a part of the existing Model 135 processor. Heretofore, its setting has been accomplished by the use of appropriate microwords included in the microroutines for those macroinstructions requiring a setting of the condition code. This procedure is still used in the FIG. 2 processor for some macroinstructions. But for other macroinstructions, time is saved by using mode bit 4 to enable the encoder 76 to directly set the condition code. This setting is done during the I-fetch microword cycle appearing at the end of the microroutine for the macroinstruction using this feature.

Mode bit 11 is used to enable the R2 field of hardware register 45 to supply address bits to ASAR 29. This is accomplished by supplying MB11 to control point logic 78 which control gates 79. In a somewhat similar vein, mode bit 14 is used to enable the R1 field of hardware register 45 to supply address bits to ASAR 29. This is accomplished by supplying MB14 to the control point logic 64 for control gates 65. MB14 is also supplied to the control point logic 66 for control gates 67 for enabling data to be written into the register in auxiliary store 28 addressed by the R1 field in hardware register 45.

Mode bits 5 and 6 are used for controlling the special improved microword addressing features associated with SAR 21. In particular, mode bit 5 is allocated to the control of the inhibiting circuitry for inhibiting the incrementing action of the incrementer 48, which inhibiting causes a given microword to be repeated a plural number of times. Mode bit 6, on the other hand, is allocated to the control of the wrap mode circuitry which inhibits the incrementing action and substitutes the microword address saved in FAR 52 for the incremented microword address normally supplied to the SAR 21. The use of these mode bits is best seen with reference to FIG. 5, which shows in greater detail the circuitry for controlling the control gate sets 49, 51 and 54 of FIG. 2.

Figure 5:
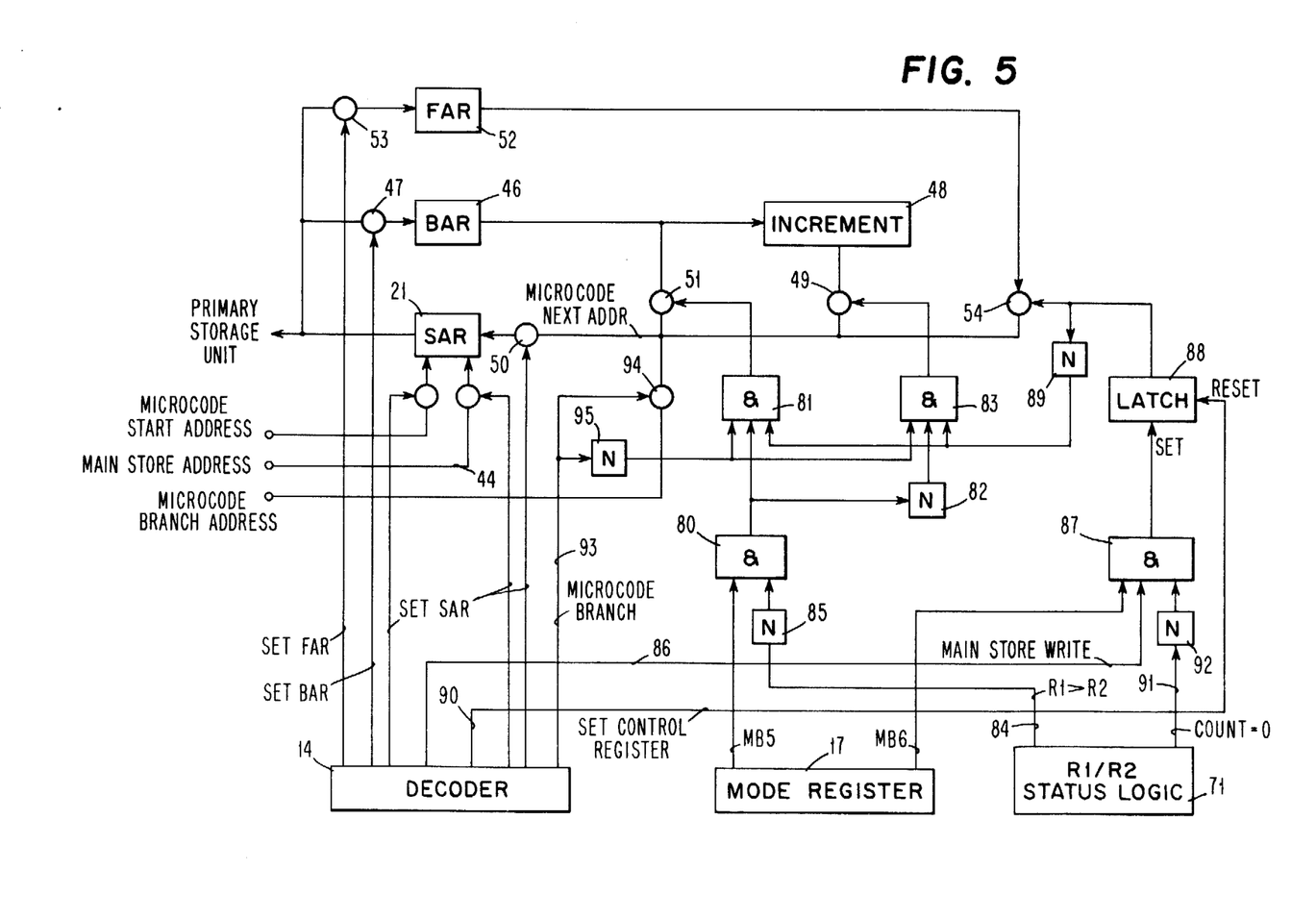
FIG. 5 shows in greater detail that part of FIG. 2a which controls the setting of the storage address register (SAR).

With reference to FIG. 5, the next microword address is normally obtained by taking the current microword address in BAR 46, incrementing it by incrementer 48 and supplying the incremented address to SAR 21 by way of control gates 49 and 50. Mode bit 5 is used to inhibit this normal incrementing action and to, instead, cause the current microword address in BAR 46 to be supplied without modification to SAR 21 by way of control gates 51 and 50. This causes the next microword to be a repeat of the current microword. This repeat action is accomplished by supplying mode bit 5 by way of AND circuits 80 and 81 to control gates 51 for enabling control gates 51 when mode bit 5 is on. The output of AND circuit 80 is, at the same time, coupled by way of NOT circuit 82 and AND circuit 83 to disable the control gates 49 when mode bit 5 is on. The current microword address in BAR 46 is then returned to SAR 21 when decoder 14 enables control gates 50 near the end of the current microword cycle. This repetition of the same microword is used in the FIG. 2 processor for Store Multiple (STM) and Load Multiple (LM) macroinstructions. The repetition continues until the R1/R2 status logic 71 produces a signal (R1>R2) indicating that the last of the multiple registers has been stored or loaded. This status signal from status logic 71 is supplied by way of line 84 and NOT circuit 85 to disable the AND circuit 80 when line 84 is turned on by the occurrence of the R1>R2 condition. This, in turn, disables the bypass control gates 51 and enables the incrementer control gates 49 to enable the system to break out of the repeat mode.

Mode bit 6 controls the use of a wrap mode feature whereby a desired plural microword subportion of a microroutine can be repeated a desired number of times. This feature is used in connection with certain storage-storage type macroinstructions wherein the operands to be moved and manipulated may be up to 256 bytes in length. The wrapping action is obtained by supplying both mode bit 6 and a decoder bit main store write signal on decoder output line 86 to an AND circuit 87. If mode bit 6 is on, the occurrence of the main store write signal causes a latch circuit 88 to be put to set condition. This enables the control gates 54 for FAR 52. At the same time, the output of the latch circuit 88 is inverted by a NOT circuit 89 to disable the AND circuits 81 and 83. This disables control gates 49 and 51. Thus, when decoder 14 enables the control gates 50 near the end of the current microword cycle, the contents of FAR 52 are set into SAR 21 to provide the next microword address. This address is the address of an earlier microword in the microroutine and, hence, there is a wrapping back to this earlier microword. As this earlier microword is set into the control register 13, the latch 88 is reset by the "set control register" signal on decoder output line 90.

This wrapping action is automatically repeated until such time as the status logic 71 indicates that the processing of the operand or operands has been completed. In particular, when the R1-R2 length counter is decremented to a count of zero or less, status logic 71 turns on an output line 91, which on condition is inverted by a NOT circuit 92 to disable the AND circuit 87. This prevents the next occurring "main store write" signal from the decoder 14 from turning on or setting the latch 88. This enables the system to break out of the wrap mode and to complete the remainder of the microroutine for that macroinstruction.

If a branch type microword is residing in control register 13 and decoder 14 determines that a branch is to be taken, then the normal supplying of the incremented BAR address to SAR 21 is, in this case, also inhibited. In particular, if decoder 14 determines that a branch is to be taken, decoder output line 93 is turned on to enable the branch address control gates 94. This on condition of decoder output line 93 is, at the same time, inverted by NOT circuit 95 and supplied to AND circuits 81 and 83 to disable same. This, in turn, disables control gates 49 and 51. Thus, when the control gates 50 are enabled near the end of the branch microword cycle, it is the branch address supplied by way of control gates 94 which is set into SAR 21 to enable the next microword to be one addressed by the branch address.

In order to better appreciate how the use of the mode bits serves to increase the instruction execution speed, the execution of a few more or less representative instructions will now be considered. As a first example, consider the case of a register-register ADD (AR) macroinstruction. This ADD macroinstruction makes use of mode bits 4 and 14. In other words, the AR op code causes the mode word array 15 to set into the mode register 17 a mode word wherein mode bits 4 and 14 are on (binary one level) and the remaining mode bits are off (binary zero level). As will be seen, mode bit 14 reduces the number of microwords needed to add the operands and store the results, while the use of mode bit 4 serves to reduce the number of microwords needed to set the condition code.

The macrooperation to be performed by the RR ADD instruction is to add the contents of the general purpose register identified by the R1 instruction field (R1 operand) to the contents of the general purpose register identified by the R2 instruction field (R2 operand) and to place the result of this addition in the general purpose register identified by the R1 instruction field. Also, it is required to set the condition code register.

In the existing Model 135 processor, two separate microwords are required to accomplish the adding of the two operands and the setting of the result into the R1 identified register. At the beginning of the execution phase, the R2 operand is in work store 26 (placed there during the preceding I-fetch microword) and the R1 operand is in auxiliary store 28. During the first microword, the R2 operand is read out of work store 26 and set into the P register 23 and the R1 operand is read out of auxiliary store 28 and set into the Q register 24. The contents of the P and Q registers 23 and 24 are then added by ALU 22 and set into S register 25. The result in S register 25 is then supplied by way of data bus 33 to work store 26 and written into work store 26 at the same preassigned location from which the R2 operand was obtained. A second microword is then required to move the result operand from work store 26 to the R1 operand register in the auxiliary store 28. This is accomplished by reading the result operand out of work store 26, setting it into P register 23, passing it through ALU 22, setting it into S register 25, passing it by way of data bus 33 to the auxiliary store 28 and writing it into auxiliary store 28.

With the use of mode bit 14, the second of these microwords is eliminated. In particular, mode bit 14 enables the result to be written into the auxiliary store 28 at the same time and during the same microword cycle that it is written into the work store 26. In particular, mode bit 14 is supplied to control point logic 64 to enable control gate 65 to supply the proper R1 address value to ASAR 29. At the same time, mode bit 14 is supplied to control point logic 66 to enable control gates 67 to pass the result operand in S register 25 to auxiliary store 28 at the same time that it is passed to work store 26. Thus, the result goes directly back to the auxiliary store 28 and the second microword is no longer needed.

The use of mode bit 4 with the RR ADD macroinstruction enables the automatic setting of the condition code register 77 with the condition code value developed by encoder 76 and supplied to the condition code register 77 by way of control gates 75. This is done during the I-fetch microword appearing at the end of the microroutine for the RR ADD instruction. This hardware setting of the condition code eliminates the branch type microwords and the different I-fetch microwords formerly used for this purpose. In particular, some seven microwords are now replaced by a single I-fetch microword.

As can be appreciated from the foregoing, the use of mode bits 4 and 14 serves to speed up the execution of the RR ADD macroinstruction. In addition and as a further benefit, fewer microwords are needed and, hence, less space in the control storage is required. In particular, some nine microwords are replaced by two microwords.

Considering now as another example the case of an RS format Load Multiple (LM) macroinstruction, such macroinstruction makes use of mode bits 1, 5 and 7. In other words, the mode word set into mode register 17 in this case has bits 1, 5 and 7 in an on condition and the remainder of the bits in an off condition. The purpose of the Load Multiple macroinstruction is to load the set of general purpose registers starting with the register designated by the R1 field of the instruction and ending with the register specified by the R3 field of the instruction with the data located in main storage starting at the main storage address determined by the B2-D2 portion of the instruction. In other words, anywhere from one to sixteen words of data are to be read out of the main store 20a and loaded into the designated set of general purpose registers in auxiliary store 28.

Mode bit 7 is supplied to control point logic 60 to enable control gates 40 to allow the data to be written directly to the auxiliary store 28 from the main store 20a. Mode bit 5 is used to control the control gates 49 and 51 to inhibit the normal incrementing of the microword address in BAR 46. This is done to cause an automatic repeat of a "read main store/write auxiliary store" microword. This microword is the same as the previously used "read main store/write work store" microword except that in the present case the write is directly to the auxiliary store and not to the work store because of the use of mode bit 7.

Mode bit 1 is used to enable the R1 portion of the hardware register 45 to function both as an address source for ASAR 29 and as a counter for keeping track of how many registers remain to be loaded. In other words, each time a register in auxiliary store 28 is loaded, the R1 field in hardware register 45 is incremented by incrementer/decrementer 70 to address the next register to be loaded. As the last register (the R2 identified register) is loaded, the R1 field in register 45 is again incremented. This causes the occurrence of the R1>R2 condition which is recognized by the status logic 71 to turn on its output line 84. This, in turn, disables bypass control gates 51 and enables incrementer control gates 49 so as to restore the normal microword address incrementing action. This enables the system to break out of the repeat mode and the next microword address which is used is the incremented address needed to address the next following microword which is, in this case, the I-fetch microword.

In addition to considerably speeding up the execution of Load Multiple (LM) macroinstructions, the use of mode bits 1, 5 and 7 enables some five microwords to be replaced by two microwords.

Considering as a further example the case of an SS format Move (MVC) macroinstruction, such macroinstruction makes use of mode bits 2 and 6. The purpose of the Move (MVC) macroinstruction is to move data from one location in the main store 20a to a second and different location in the main store 20a. The length of the data to be moved is specified by the length field in the instruction and can vary from one to 256 bytes in length. In particular, the specified length of data starting at the main store address determined by the B2-D2 portion of the instruction is moved to a new main storage location starting at the main storage address determined by the B1-D1 portion of the instruction.

Obviously, if the length of data to be moved is very great, it cannot be moved all at once. Thus, in general, the data is moved in chunks or segments until the entire length is moved. Also, the movement is accomplished by way of work store 26. In other words, each segment of data is read out of main store 20a and written into work store 26 during one microword cycle. It is thereafter read out of the work store 26 and written back into the main store 20a during another microword cycle. Also, the data segment may be manipulated or tested before it is written back to the main store 20a.

Mode bit 2 is used to enable the R1 and R2 portions of the hardware register 45 to be used in combination as a single counter for keeping track of the length or amount of data remaining to be moved. In particular, each time a segment of data is read out of the main store 20a and transferred to the work store 26, this R1-R2 counter is decremented by incrementer/decrementer 70 to reduce the length count by the amount of data in this data segment.

Mode bit 6 is used to provide an automatic wrapping or repeating of the microroutine portion involved in the process of reading a data segment out of main store 20a, putting it into work store 26, performing an appropriate manipulation or testing, reading it out of work store 26 and writing it back into the main store 20a at its new location. In particular, the address used to obtain the first microword in this read segment/write segment subroutine is also set into FAR 52. The subroutine portion is then executed, one microword at a time. During the last microword in the subroutine portion, in this case, the "write to main store from work store" microword, the on condition of mode bit 6 causes the latch 88 (FIG. 5) to be set to enable the FAR output control gates 54 and to disable the bypass and incremental control gates 51 and 49. This causes FAR 52 to provide the next microword address. This, in turn, causes a return to the first microword in the read segment/write segment subroutine. As this first subroutine microword is set into the control register 13, the latch 88 (FIG. 5) is reset to allow a normal incrementing through the microwords in the subroutine portion.

This automatic wrapping of the read segment/write segment subroutine continues until the R1/R2 status logic 71 says that there are no more data segments to be moved. In particular, when the R1-R2 length counter in hardware register 45 is finally decremented to a value of zero or less, status logic 71 recognizes this occurrence and turns on its output line 91 to disable the wrapping action.

From these examples, as well as those considered earlier, it is seen that the use of the microcontrol extension mechanism provided by the mode word array 15 and the mode register 17 enables the data processor represented in FIG. 2 to have an improved performance/cost ratio relative to the existing Model 135 data processor. As can be surmised from the foregoing, this microcontrol extension mechanism is particularly useful in updating and improving the performance of an existing processor at a minimum of added cost, though its use, of course, is not limited to this particular application.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a microprogrammed data processor having data processor circuitry comprised of an arithmetic unit part, register parts and other processor parts interconnected by data flow bus parts to define a data flow path, all for processing machine macroinstructions having operation codes, the combination comprising:

a plurality of control points interspersed at predetermined locations in the data flow path, said control points being adapted and cooperatively coupled therein to enable and disable data flow in predetermined portions of the data flow path;

a primary store for storing microwords for defining control actions for predetermined combinations of parts of the data processor circuitry;

primary store address circuitry for reading microwords out of said primary store;

a first secondary store having stored therein a plurality of mode words for defining additional control actions for predetermined combinations of parts of the data processor circuitry and said control points;

a mode register cooperatively coupled between said secondary store and said control points having output lines coupled to said control points of the data processor circuitry for controlling same;

circuitry responsive to the current machine macroinstruction operation code for addressing said first secondary store and causing it to supply a selected mode word to said mode register;

a second secondary store having stored therein a plurality of starting addresses for different sequences of microwords in said primary store; and circuitry responsive to the current machine macroinstruction operation code for addressing said second secondary store and causing it to supply a selected starting address to said primary store address circuitry for selecting the particular sequence of microwords to be read out of the primary store.

2. The combination of claim 1 wherein:

said primary store includes a separate sequence of microwords for each of the different machine macroinstruction operation codes;

said second secondary store has a separate addressable storage location for each of the different machine macroinstruction operation codes; and the starting address stored in each such storage location in said second secondary store is the starting address for the corresponding microword sequence in said primary store.

3. The combination of claim 2 wherein in the majority of cases each separate sequence of microwords in said primary store contains all the microwords needed for executing that particular machine macroinstruction.

4. The combination of claim 1 wherein each of said first and second secondary stores is an integrated circuit read only storage array.

5. The combination of claim 1 wherein each of said first and second secondary stores has a separate addressable storage location for each of the different machine macroinstruction operation codes.

6. The combination of claim 5 wherein the machine macroinstruction operation code is supplied to said address circuitry of each of said secondary stores for directly addressing each of such secondary stores.

7. In a microprogrammed data processor having data processor circuitry comprised of an arithmetic unit part, register parts and other processor parts interconnected by data flow bus parts to define a data flow path, all for processing machine macroinstructions having operation codes, the combination comprising:

a plurality of control points interspersed at predetermined locations in the data flow path, said control points being adapted and cooperatively coupled therein to enable and disable data flow in predetermined portions of the data flow path;

a primary store for storing a large number of separately addressable microwords for defining control actions for predetermined combinations of parts of the data processor circuitry;

primary store address circuitry for reading microwords out of said primary store;

a control register for receiving microwords one at a time from said primary store;

decoder circuitry coupled to said control register for decoding the microword residing therein and supplying control signals to the appropriate ones of said predetermined parts of the data processor circuitry;

a first secondary store having stored therein a plurality of mode words for defining additional control actions for predetermined combinations of parts of the data processor circuitry and said control points;

a mode register cooperatively coupled between said secondary store and said control points having output lines coupled to said control points of the data processor circuitry for controlling same;

circuitry responsive to the current machine macroinstruction operation code for addressing said first secondary store and causing it to supply a selected mode word to said mode register;

a second secondary store having stored therein a plurality of starting addresses for different sequences of microwords in said primary store;

circuitry for coupling the output of said second secondary store to said primary store address circuitry; and circuitry responsive to the current machine macroinstruction operation code for addressing said second secondary store and causing it to supply a selected starting address to said primary store address circuitry for selecting the particular sequence of microwords to be read out of said primary store.

8. The combination of claim 7 wherein:

said primary store includes a separate sequence of microwords for each of the different machine macroinstruction operation codes;

said second secondary store has a separate addressable storage location for each of the different machine macroinstruction opertion codes; and the starting address stored in each such storage location in said second secondary store is the starting address for the corresponding microword sequence in said primary store.

9. The combination of claim 8 wherein in the majority of cases each separate sequence of microwords in said primary store contains all the microwords needed for executing that particular machine macroinstruction.

10. The combination of claim 8 wherein each of said first and second secondary stores is an integrated circuit read only storage array.

11. The combination of claim 8 wherein each of said first and second secondary stores has a separate addressable storage location for each of the different machine macroinstruction operation codes.

12. The combination of claim 11 wherein the machine macroinstruction operation codes are supplied to the address circuitry of each of said first and second secondary stores for directly addressing each of such secondary stores.

13. In a microprogrammed data processor having data processor circuitry comprised of an arithmetic unit part, register parts and other processor parts interconnected by data flow bus parts to define a data flow path, all for processing machine macroinstructions having operation codes, the combination comprising:

a plurality of control points interspersed at predetermined locations in the data flow path, said control points being adapted and cooperatively coupled therein to enable and disable data flow in predetermined portions of the data flow path;

a primary store for storing microwords for defining control actions for predetermined combinations of parts of the data processor circuitry and including different sequences of microwords for different ones of the machine macroinstruction operation codes;

primary store address circuitry for reading microwords out of said primary store;

circuitry responsive to the macroinstruction to be processed for supplying a particular microword starting address to said primary store address circuitry;

circuitry for incrementing the microword address residing in said primary store address circuitry for enabling successive microwords to be read out of said primary store in a sequential manner;

inhibiting circuitry for inhibiting said incrementing circuitry and thereby causing a given microword to be executed a plural number of times in succession;

a secondary store having stored therein a plurality of plural-bit mode words for defining additional control actions for predetermined combinations of parts of the data processor circuitry and said control points and wherein a given bit position in each mode word is allocated to the control of the inhibiting circuitry and wherein such bit is set to an on status in at least one predetermined mode word and to an off status in the other mode words;

a mode register cooperatively coupled between said secondary store and said control points and including an output line for the given mode word bit position, which output line is coupled to said inhibiting circuitry for controlling the inhibiting action thereof; and circuitry responsive to the operation codes of the machine macroinstructions being processed for addressing said secondary store and causing it to supply different selected mode words to said mode register for different ones of the operation codes, whereby said incrementing circuitry is inhibited during the occurrence of the operation code which selects the predetermined mode word having the inhibiting control bit set to an on status.

14. The combination of claim 13 and further including counter circuitry controlled by the microword read out of the said primary store for keeping track of the number of executions of the given microword and coupled to said inhibiting circuitry for causing the discontinuance of the inhibiting action upon occurrence of a predetermined count status.

15. In a microprogrammed data processor having data processor circuitry comprised of an arithmetic unit part, register parts and other processor parts interconnected by data flow bus parts to define a data flow path, all for processing machine macroinstructions having operation codes, the combination comprising:

a plurality of control points interspersed at predetermined locations in the data flow path, said control points being adapted and cooperatively coupled therein to enable and disable data flow in predetermined portions of the data flow path;

a control store for storing microwords for defining control actions for predetermined combinations of parts of the data processor circuitry and including different sequences of microwords for different ones of the machine macroinstruction operation codes;

a storage address register for reading microwords out of said control store;

circuitry responsive to the machine macroinstruction to be processed for supplying a particular microword starting address to said storage address register;

circuitry for incrementing the microword address residing in said storage address register for enabling successive microwords to be read out of said control store in a sequential manner;

a secondary address register for saving a copy of a particular microword address when it appears in said storage address register; and wrap mode circuitry responsive to the occurrence of at least one predetermined machine macroinstruction operation code and active during the execution of a microword subsequent to the microword whose address was saved in the secondary address register for inhibiting said incrementing circuitry and causing the saved copy of the microword address to be returned to said storage address register for automatically causing a given plural microword portion of the microword sequence to be executed a repeated number of times in succession.

16. The combination of claim 15 wherein the wrap mode circuitry includes:

substitution circuitry for inhibiting said incrementing circuitry and causing the saved copy of the microword address to be returned to said storage address register;

a secondary store having stored therein a plurality of plural-bit mode words wherein a given bit position in each mode word is allocated to the control of said substitution circuitry and wherein each such bit is set to an on status in at least one predetermined mode word and to an off status in the other mode words;

a mode register cooperatively coupled between said secondary store and said control points and including an output line for the given mode word bit position, which output line is coupled to said substitution circuitry for controlling the operation thereof; and circuitry responsive to the operation codes of the machine macroinstructions being processed for addressing said secondary store and causing it to supply different selected mode words to said mode register for different ones of the operation codes, whereby said substitution circuitry is activated during the occurrence of the operation code which selects the predetermined mode word having the substitution control bit set to an on status.

17. The combination of claim 16 further including counter circuitry coupled to said wrap mode circuitry for keeping track of the number of repetitions of the given portion of the microword sequence and for causing the discontinuance of the inhibiting action upon occurrence of a predetermined count status.

18. In a microprogrammed data processor having data processor circuitry comprised of an arithmetic unit part, register parts and other processor parts interconnected by data flow bus parts to define a data flow path, all for processing machine macroinstructions having operation codes, the combination comprising:

a plurality of control points interspersed at predetermined locations in the data flow path, said control points being adapted and cooperatively coupled therein to enable and disable data flow in predetermined portions of the data flow path;

a primary store for storing plural-bit microwords of predetermined length for defining control actions for predetermined combinations of parts of the data processor circuitry, the number of different control actions provided by the different encodings of the microwords being limited by the predetermined length of the microwords;

a secondary store for storing plural-bit mode words for defining additional control actions for predetermined combinations of parts of the data processor circuitry and said control points;

secondary store address circuitry responsive to the operation codes of the machine macroinstructions being processed for causing different ones of the mode words to appear at the output of said secondary store for different ones of the operation codes; and circuitry for coupling the output of said secondary store to said control points of the data processor circuitry for controlling same and thereby increasing the number of different control actions in the same manner as could be accomplished by increasing the length of the microwords in said primary store, the different ones of such mode words enabling control of different subsets of said control points during the execution of machine macroinstructions having different operation codes, each mode word providing the added control needed during the execution of a single machine macroinstruction.

* * * * *